United States Patent
West

[11] Patent Number: 5,609,700
[45] Date of Patent: Mar. 11, 1997

[54] OPERATOR SELECTABLE "ON DEMAND" STUDDED TIRE

[76] Inventor: Allen D. West, P.O. Drawer 310, Catoosa, Okla. 74015

[21] Appl. No.: 539,628

[22] Filed: Oct. 5, 1995

Related U.S. Application Data

[63] Continuation of Ser. No. 149,274, Nov. 6, 1993, abandoned.
[51] Int. Cl.$^6$ ............................. B60C 23/00; B60C 11/14
[52] U.S. Cl. ............................................. 152/210; 152/415
[58] Field of Search ..................................... 152/210, 211, 152/212, 208, 415

[56] References Cited

U.S. PATENT DOCUMENTS

| | | | |
|---|---|---|---|
| 2,012,773 | 8/1935 | Rockman | 152/208 X |
| 2,217,122 | 10/1940 | Lowry | 152/339.1 X |
| 2,235,375 | 3/1941 | Kraft | 152/415 X |
| 2,925,112 | 2/1960 | Seaman | 152/211 |
| 3,672,421 | 6/1972 | Anderson | 152/208 |
| 3,872,908 | 3/1975 | Einarsson | 152/208 |
| 3,942,572 | 3/1976 | Crandall | 152/208 |

FOREIGN PATENT DOCUMENTS 1223007  9/1989  Japan ............................. B60C 23/00

Primary Examiner—Michael W. Ball
Assistant Examiner—Francis J. Lorin
Attorney, Agent, or Firm—Head, Johnson & Kachigian

[57] ABSTRACT

An improved all-weather vehicle tire having traction enhancing studs located in a position outside the normal tread area which allows a vehicle operator to selectively choose operation as a conventional tire on dry roads or as a studded tire on ice-coated roads by the simple expedient of reducing or increasing the air pressure within the tire. Specifically designed for areas which experience ice storms or freezing rain which remains on roadways for relatively short periods of time, the tire provides excellent traction on ice, yet may be quickly and conveniently returned to conventional tire operation with little effort by the vehicle operator.

7 Claims, 1 Drawing Sheet

OPERATOR SELECTABLE "ON DEMAND" STUDDED TIRE

This is a continuation of Ser. No. 08/149,274 filed on Nov. 6, 1993 now abandoned.

BACKGROUND OF THE INVENTION

Since the advent of the powered wheel, man has relentlessly searched for means to enhance the traction of the wheel with the surface upon which it operates. Early on, the wide steel driving wheels of stem powered traction machinery were equipped with massive steel lugs which bit into the earth and gave the wheel the traction required to pull a number of breaking or turning plows through the earth. The wide wheels were necessary to provide the area required to support the tractor and prevent its _great weight from causing it to sink into the earth, while the lugs provided the grip in the soil required to pull the plows. The coming of the horseless carriage created an entirely new set of problems, as it was nothing more than a motorized adaptation of a horse-drawn vehicle, having free-turning wheels, which were meant to be pulled across the earth, rather than propelled by the powered rotation of the wheels. It was soon discovered that the steel band, or tire, that encircled the wooden wheel rims, was only suitable for use on hard-packed and tinder-dry surfaces and from this discovery there evolved the wider solid rubber and then the pneumatic tire. Since the evolution of the pneumatic tire, great effort has been dedicated in the search for means to improve the traction of the driving wheels of all manner of vehicles upon the surface and under the conditions which they must operate. Water, mud and snow are three of the most difficult conditions to address with a modern vehicle tire. Each of these conditions requires a specific tire tread suited either to channelize the water away from the tire or grip the soft or slippery surface and either bring more material under the tread area or compact the material to provide a suitably stable driving surface. These conditions however, pale by comparison with the problems encountered when operating a wheeled vehicle on an ice covered surface. No amount of tread, ribs, bars or other such means are effective upon a surface of solid ice. While time-honored detachable tire chains or cleats provide a measure of traction under these conditions, their use has never been popular due to the difficulty of installation and removal and the bone-shaking ride which they impart to a vehicle employing them.

In an attempt to solve these problems the "studded tire," which comprises a tread area which includes a number of hard stud-like projections which extend a short distance beyond the face of the tread to slightly penetrate the surface of the ice and thereby provide a limited mount of traction between tire and roadway, was developed. While it appeared that the studded tire would be the definitive solution to the operation of a vehicle on an ice covered surface, such was not the case. Soon after the introduction of studded tires, street and highway officials began to detect rapid deterioration of street and roadway surfaces and called for legislation to restrict their use. Today, in most states and municipalities, the use of the studded tire is controlled by law, ordinance or regulation requiring that such tires be used only during certain winter months and that they be removed from service during the warmer months. Unfortunately, some states, notably Hawaii, Illinois, Louisiana, Michigan, Minnesota, Mississippi and Wisconsin have enacted legislation which prohibits their use at any time and have thus deprived motorists of the safety and convenience advantages that they provide. The reasons for such regulations are obvious however, as tungsten steel studs are of a hardness greater than the surface of even the most durable of roadways and are capable of chipping away at the concrete with each revolution of a vehicle's wheels. Mother factor which has to some extent lessened the popularity of the studded tire is the fact that the protruding stud reduces, to a certain degree, the ability of the tire to grip a dry roadway with a consequent diminution of braking action. Also, the rotation of the studded tire upon a dry roadway causes an undesirable noise and vibration inside the vehicle and finally, the requirement for removal of studded tires during the warmer months and their re-installation for the winter requires either a second set of wheels for each vehicle or the semi-annual removal and replacement of the tires upon the same wheels with the consequent potential for damage to the "bead" or air sealing area of the tire. Of lesser importance, but still a factor affecting their popularity, is the requirement for storage space for the second set of tires when they are out-of-service.

In the more temperate areas of the nation the requirement for ice studs is virtually non-existent or may be limited to only a few as a days a year and quite possibly only for a portion of those days. For example, in the United States, regions south of the 31st parallel, except in the higher elevations, are seldom subject to climatic conditions which produce freezing rain and the consequent coating of ice which makes studded tires necessary. Conversely, the area north of the 36°–30' parallel is likely to have ice, snow or a combination of both on the ground for many days or even weeks. The area between these two parallels may have an ice storm overnight which may result in almost impossible driving conditions during a morning commute, while the evening commute may be made on dry, or nearly dry, roadways.

In order to accommodate the differing requirements of various geographical and climatic regions a number of inventors have attempted to solve these problems by providing tires with retractable traction enhancing elements. Examples of these earlier attempts are illustrated in the prior art in the following disclosures. Lowry, in U.S. Pat. No. 2,217,122 disclosed an "Anti Skid Tire" having two substantially concentric casings which are selectably inflatable or deflatable to cause the extension or retraction of stud-like anti-skid projections. Anderson in U.S. Pat. No. 3,672,421 similarly disclosed a method whereby stud-like projections are forced through the tread area of a tire by differential air pressure between the interior of the cuing and hoses which pass about the inner periphery of the casing and pass under staple-like retractable studs. Einarsson in U.S. Pat. No. 3,872,908 employs a similar differential air pressure system for extending and retracting studs through the tread area of a tire and provides an internal receiver for high pressure actuating air within the casing and a specialized valve for filling said reservoir and extending or retracting the studs. Crandall in U.S. Pat. No. 3,942,572 employs a multi-chambered cuing which allows the pneumatic outward flexure, into roadway contact, of a centrally situated stud-bearing band about the periphery of the tire at the center of the tread band.

While it is not the intention of this applicant to derogate the objectives of these inventors, or be critical of their efforts, it is obvious that none were familiar with the, then and now, gate-of-the-art of tire manufacturing technology and as a consequence, these inventions have not been adopted by the industry and have thus been relegated to obscurity.

OBJECT OF THE INVENTION

It is the object of the present invention to provide a traction enhancing studded tire for use on ice covered roadways, having an operator or driver selectable "on-demand" feature for engaging and disengaging traction enhancing studs, which is economical to produce, is simple in construction and is easily operable by the average vehicle operator without special knowledge, skills, tools or equipment. It is a further object of the invention to make these features available without the requirement, on the part of a manufacturer to change the basic structure of a conventional tire; without large capital investment in new machinery, extensive modification of existing machinery, or the retraining of manufacturing personnel; to make the use of studded tires practical in climatic zones in which ice coated roadways are an infrequent occurrence and are of a short duration and; to allow the tires to be employed year-round without causing unnecessary wear to the roadway, yet be instantly available in a studded configuration when required.

A BRIEF DESCRIPTION OF THE DRAWING FIGURES

THE PREFERRED EMBODIMENT OF THE INVENTION

Figure 1:
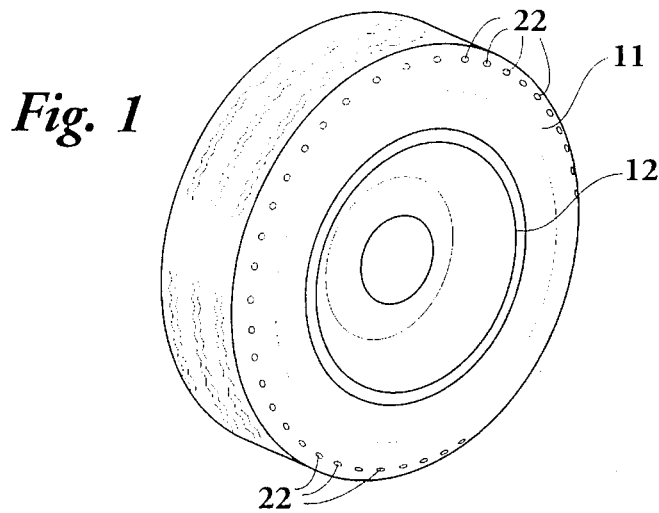
FIG. 1 is an overall perspective view of a tire equipped with "on-demand" traction enhancing studs mounted on a vehicle wheel.

Referring now in greater detail to the FIGURES OF THE DRAWINGS it will it will readily be seen in FIG. 1 that in the preferred embodiment of the present mention, a conventionally constructed pneumatic tire, generally designated as 11 is mounted upon a conventional wheel 12.

Figure 2:
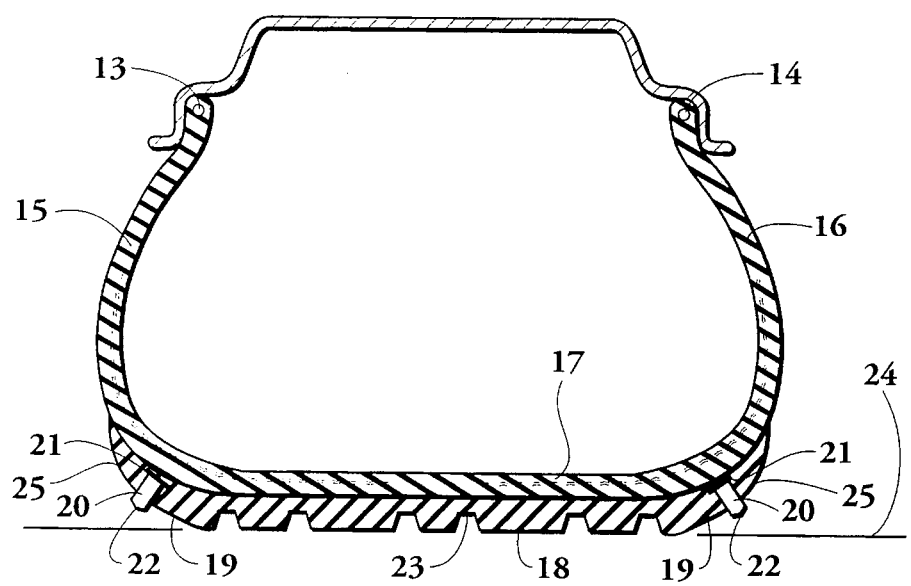
FIG. 2 is a sectional view of the tire and wheel of FIG. 1 in a fully inflated condition, bearing the weight of the vehicle, illustrating the traction enhancing studs in the normal operating position, out-of-contact with the surface of the roadway.

In FIG. 2 it will be seen, in sectional view, that said tire 11 is substantially conventional in all respects and comprises a pair of opposed outwardly facing air pressure retaining wheel-engaging "beads" 13 and 14, integrally formed with opposing multi-ply sidewalls 15 and 16 which are in continuous integral conjoinment with a transverse treadwall 17 of conventional construction upon which is situate an integrally formed and continuous, circumferential tread band 18. It is stipulated that all of the foregoing is well known, is anticipated either by the prior art or by prior usage and does not constitute a part of the present invention. In the present invention, said tread band 18 is provided proximate each of the two outer edges thereof with concentric, circumferential chamfered or beveled areas 19 which provide an angular transition from tread area to sidewall, said chainfeted or beveled areas 19 extending outwardly and upwardly at an angle approximating 35° to 45° above the horizontal. A circumferential translation area 25 originates and is integrally formed at the outer edge of each beveled area 19, the translation area 25 terminating at the area of conjoinment of the treadwall 17 with the sidewalls 15, 16. Adjacent the upper or outer limit of said concentric beveled areas, a plurality of angularly disposed, radially spaced-apart (a distance of 1 to 1¼ inches) dimensioned bores 20 of a diameter adapted to receive conventional traction enhancing studs 22 and of a specific depth 21, adapted to accommodate said studs, are provided about the entire circumference of both edges of the tread band 18 in such a manner that when the tire is fully inflated to normal operating pressure, traction enhancing studs 22, installed in said bores at an outwardly projected angle of approximately 45° to the surface of the roadway, are elevated to a position out-of-contact with the roadway 24. It is to be noted that when said studs are thus installed and said tire is thus inflated, the traction enhancing studs 22 cannot achieve contact with the surface of the roadway 24 until such time as the entire tread depth 23 of the tire has been expended.

Figure 3:
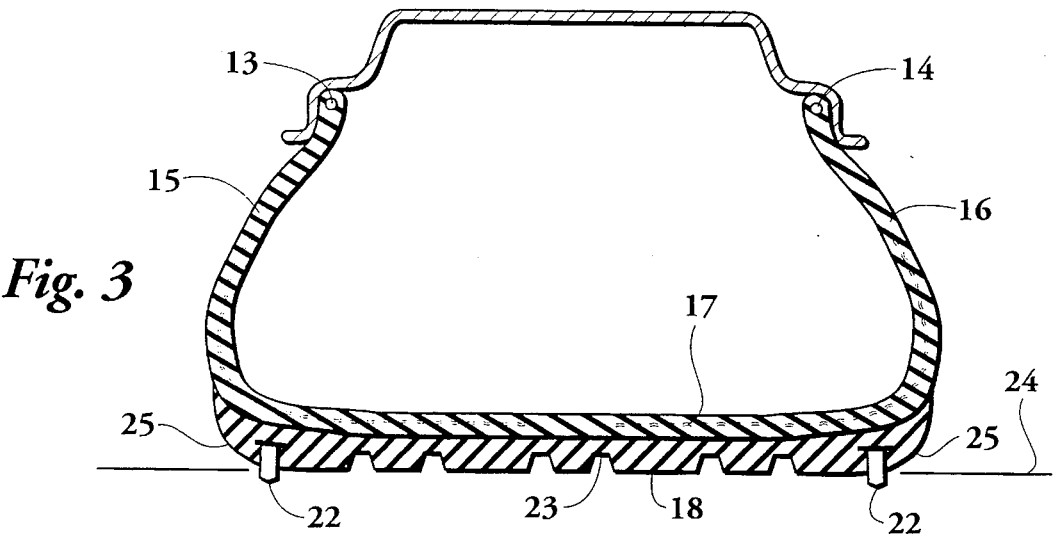
FIG. 3 is a sectional view of the tire and wheel of FIG. 1 in a reduced pressure or partially deflated condition, bearing the weight of the vehicle, illustrating the traction enhancing studs in friction enhancing engagement with the ice covered surface of the roadway.

When ice-coated roadways are encountered it is only necessary for the vehicle operator to release a sufficient quantity of air pressure from the tire to cause the "footprint" of the tire to broaden slightly, as is illustrated in FIG. 3, to cause the traction enhancing studs 22 to descend rotationally, into engagement with the ice-coated surface of the roadway 24. With this accomplished the driver may continue on his way enjoying the benefits of the increased traction imparted by the studs, secure in the knowledge that he has greater control of the vehicle than would otherwise be possible. Upon leaving the ice-coated area or when the hazardous condition no longer exists, the driver may, at the first opportunity, restore the normal inflation pressure to the tires at a service station, or by use of "on-board" pressurized air carried in a small cylinder in the luggage compartment or with one of the numerous commercially available battery-powered air compressors specifically designed for that purpose and thus restore the tire to the normal configuration illustrated in FIG. 2.

The advantages afforded by employment of the present invention are manifold and include: 1) the reduction of wear upon the highways and streets caused by the use of studded tires when driving conditions do not require them; 2) the elimination of "in-vehicle" noise and vibration associated with the use of studded tires on dry roadways; 3) increased driver confidence derived from the knowledge that he has the proper tire for any occasion, geographic area, state or weather condition; 4) increased tire life resulting from maintaining tire pressure at proper levels; 5) instant driver awareness of a decrease in normal tire pressure by the audible and vibratory alarm caused by the studs coming into contact with the roadway surface; 6) improved braking action in the dry roadway configuration; 7) improved traction on ice-coated roadways; 8) simple, convenient vehicle driver operation; 9) no requirement for the inconvenience and effort required for the installation and removal of anti-skid chains and most importantly; 10) the reduction of hazards to life, limb and property occasioned by driving on ice-coated roadways.

Other advantages offered by the present invention are those of an economic nature provided the tire manufacturer which include: 1) no capital intensive mold modification (two simple circular inserts necessary to create the required bevels and stud insertion holes may be removably attached to the interior of an existing mold at relatively minor cost); 2) each tire carcass can be provided with stud insertion holes for the installation of either conventional (full-time) or "on-demand" studs (Note: Tire manufacturers do not factory-install studs in the tires during manufacture. They provide a treaded carcass which is equipped with prepared holes in which studs may be installed at the point-of-sale.)

and; 3) manufacturers inventories need not be increased to provide an additional tire type as one carcass, with holes provided for the installation of studs at either of the two locations, actually becomes two products—for the price of one.

The present invention, which by the simple expedient of the provision of beveled areas proximate the edges of the treaded area of a pneumatic tire and angularly disposed dimensioned bores to permit the installation of traction enhancing studs, adapted to be brought into engagement with the roadway only when conditions warrant and readily disengagable when conditions improve, provides tangible benefit to consumers, manufacturers and also to those charged with the maintenance of roadways and is the true embodiment of simplicity of design.

While there has herein been disclosed, illustrated and explained the presently preferred embodiment of the present invention, it should be understood that such has been done for purposes of clarification only and that certain changes, modification and alteration may be made thereto within the scope and spirit of the appended claims.

What I claim is:

1. An improved studded tire of the type having a pair of outwardly facing and air pressure retaining wheel-engaging beads, opposing multi-ply sidewalls, a transverse treadwall in continuous integral conjoinment with said sidewalls, and an integrally formed and continuous circumferential tread band situated upon said treadwall, wherein the improvement comprises:

(a) a circumferential beveled area integrally formed at each of the two outer edges of said tread band;

(b) a circumferential translation area integrally formed at the outer edge of each said beveled area, said translation area terminating at the area of conjoinment of said treadwall with said sidewalls;

(c) a plurality of angularly disposed, radially spaced apart bores positioned at the outer edge of said beveled area, said bores only partially penetrating said beveled area; and (d) a plurality of traction enhancing studs placed within said bores, such that when said improved studded tire is filled with air at a relatively high pressure, said studs do not contact with the road surface, and when said improved studded tire is filled with air at a relatively low pressure, said studs contact the road surface.

2. The improved studded tire according to claim 1, wherein said circumferential beveled area extends outwardly and upwardly at an angle approximating 35° to 45° above the horizontal.

3. The improved studded tire according to claim 1, wherein said bores are radially spaced apart at a distance of 1 to 1¼ inches.

4. The improved studded tire according to claim 1, wherein said bores are positioned at a point on the outer edge of said beveled area such that, when inflated at a relatively high pressure, said studs cannot achieve contact with the road surface until such time as the entire depth of said tread band has been expended.

5. An improved studded tire of the type having a pair of outwardly facing and air pressure retaining wheel-engaging beads, opposing multi-ply sidewalls, a transverse treadwall in continuous integral conjoinment with said sidewalls, and an integrally formed and continuous circumferential tread band situated upon said treadwall, wherein the improvement comprises:

(a) a circumferential beveled area integrally formed at each of the two outer edges of said tread band, said circumferential beveled area extending outwardly and upwardly at an angle approximating 35° to 45° above the horizontal;

(b) a circumferential translation area integrally formed at the outer edge of each said beveled area, said translation area terminating at the area of conjoinment of said treadwall with said sidewalls;

(c) a plurality of angularly disposed, radially spaced apart bores positioned at the outer edge of said beveled area, said bores being radially spaced apart at a distance of 1 to 1¼ inches and only partially penetrating said beveled area; and (d) a plurality of traction enhancing studs placed within said bores, such that when said improved studded tire is filled with air at a relatively high pressure, said studs do not contact with the road surface, and when said improved studded tire is filled with air at a relatively low pressure, said studs contact the road surface.

6. The improved studded tire according to claim 5, wherein said bores are positioned at a point on the outer edge of said beveled area such that, when inflated at a relatively high pressure, said studs cannot achieve contact with the road surface until such time as the entire depth of said tread band has been expended.

7. A traction enhancing tire for mounting on a conventional wheel having an inside and an outside surface, said tire comprising:

(a) a circumferential inside bead for engaging said inside surface of said wheel;

(b) a circumferential outside bead for engaging said outside surface of said wheel;

(c) a circumferential casing affixed to said inside bead and said outside bead;

(d) a circumferential tread band affixed to said casing and forming a road contacting surface;

(e) a circumferential inside beveled area and a circumferential outside beveled area integrally formed at the outer edges of said tread band, said inside and outside beveled areas having partially penetrating bores therethrough;

(f) a plurality of traction enhancing studs placed within said bores, said studs positioned so as to contact the road surface when said tire is filled with air at a relatively low pressure and so as not to contact the road surface when said tire is filled with air at relatively high pressure; and (g) a circumferential translation area integrally formed at the outer edge of each said beveled area and termination along said casing.

* * * * *

UNITED STATES PATENT AND TRADEMARK OFFICE
CERTIFICATE OF CORRECTION

PATENT NO. : 5,609,700

DATED : March 11, 1997

INVENTOR(S) : Allen D. WEST

It is certified that error appears in the above-indentified patent and that said Letters Patent is hereby corrected as shown below:

Column 1, line 12, delete "stem" and substitute --steam-- therefor;

Column 1, line 17, delete "_great" and substitute --great-- therefor;

Column 1, line 52, delete "mount" and substitute --amount-- therefor;

Column 2, line 5, delete "Mother" and substitute --Another-- therefor;

Column 2, lines 48 and 57, delete "cuing" and substitute --casing-- therefor;

Column 2, line 64, delete "gate-of-the-art" and substitute --state-of-the-art-- therefor;

Column 3, line 18, delete "fires" and substitute --tires-- therefor;

Column 3, line 29, delete "beating" and substitute --bearing-- therefor;

Column 3, line 44, delete "mention" and substitute --invention--therefor;

Column 3, line 61, delete "chainfeted" and substitute --chamfered-- therefor;

UNITED STATES PATENT AND TRADEMARK OFFICE
CERTIFICATE OF CORRECTION

PATENT NO. : 5,609,700

DATED : March 11, 1997

INVENTOR(S) : Allen D. WEST

It is certified that error appears in the above-indentified patent and that said Letters Patent is hereby corrected as shown below:

Column 4, line 65, delete "fires" and substitute --tires-- therefor; and

Signed and Sealed this

Second Day of September, 1997

*Attest:*

BRUCE LEHMAN

*Attesting Officer*  Commissioner of Patents and Trademarks